United States Patent Office 3,348,606
Patented Oct. 24, 1967

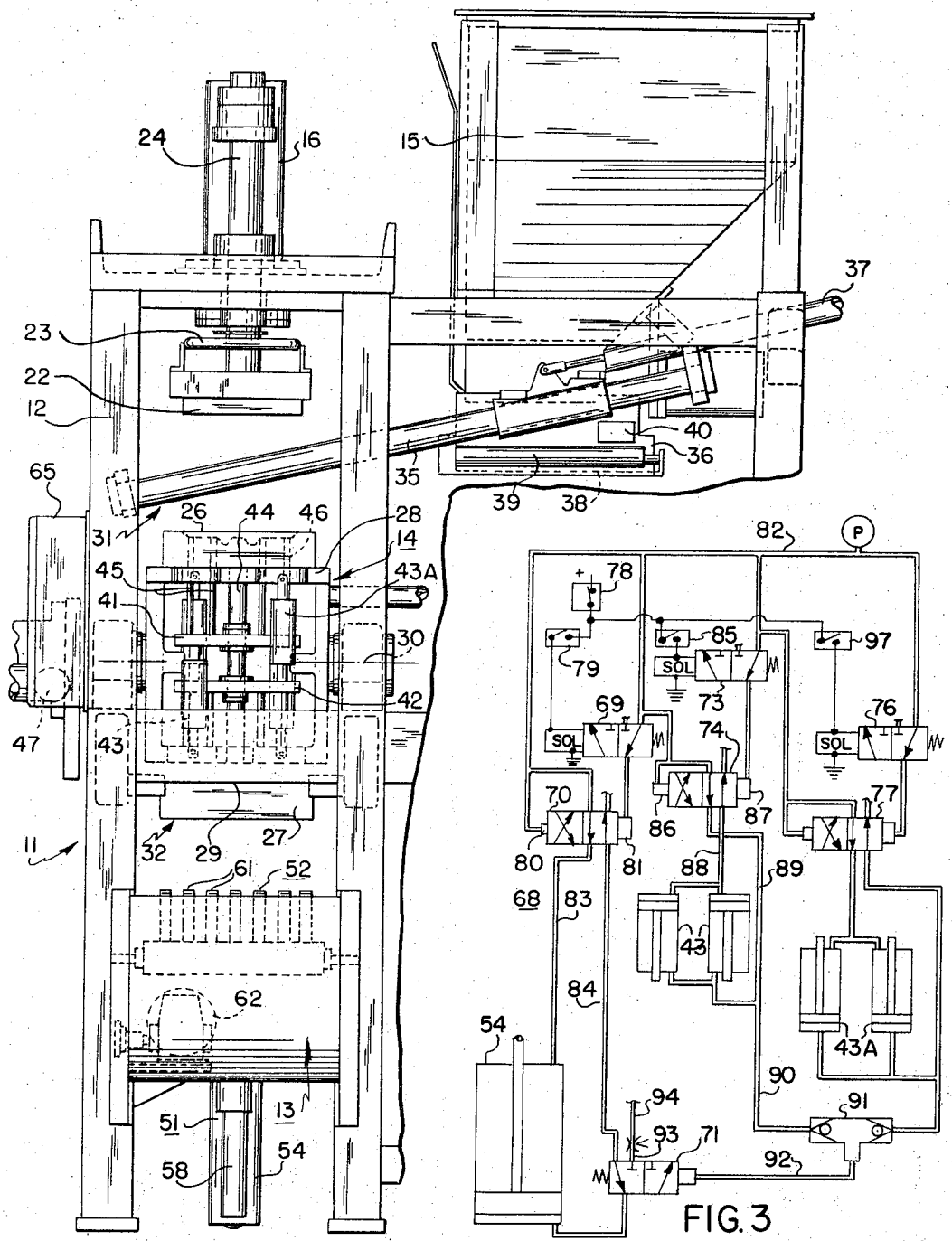

3,348,606
MOLDING MACHINE TRANSFER MECHANISM
Edward J. Ptak and Kenneth E. Bellis, Cleveland, and Glenn S. Marks, Euclid, Ohio, assignors to The National Acme Company, a corporation of Ohio
Filed June 15, 1965, Ser. No. 464,067
15 Claims. (Cl. 164—219)

ABSTRACT OF THE DISCLOSURE

The disclosure shows a transfer mechanism for a molding machine. A mold box may be filled with molding material and partially cured to retain its shape. The mold box is carried in a tumbling assembly and is then tumbled 180 degrees about a horizontal axis to invert the mold box. A first strip transfer means is moved up into engagement with the completed mold and a first stripper plate ejects the completed mold downwardly out of the mold box and pushes the first strip transfer means downwardly against a slight resistance. This maintains the mold under opposing forces as the mold is moved directly vertically downwardly to avoid breaking the mold. The first transfer means then continues downwardly and transfers the mold into a horizontal transfer means of strips which are interleaved with the first transfer means.

---

The invention relates in general to molding machines and more particularly to a transfer mechanism designed to transfer completed molds or cores made in the molding machine.

The invention may be incorporated in a molding machine for use with a mold box comprising in combination a frame, a discharge station on said frame, means to fill a mold box with molding material and to at least partially cure said molding material into a completed mold, means to present the filled mold box at said discharge station in an inverted position, first transfer means carried relative to said frame beneath said discharge station and having first strip means, second transfer means carried relative to said frame beneath said discharge station for movement with a horizontal component and having second strip means interleaved between said first strip means, each of said strip means presenting a generally flat-topped surface, means to move said first transfer means upwardly between the strip means of said second transfer means from a lower, retracted position to an upper position with said flat-topped surface thereof generally parallel to the mold box at said discharge station to receive the completed mold, and means to cause downward retraction of said first transfer means to transfer from the flat-topped surface thereof a completed mold onto the flat-topped surface of said second transfer means for movement with said second transfer means.

In prior molding machines the completed mold was often released in a heated condition to an operator who wore asbestos or heat-insulated gloves to receive this heated core. The operator then carried the core to some conveyor belt or stacked the completed core on a pallet for later removal. This required considerable hand work and also was time consuming for the operator who must be ready to receive the completed mold when the machine delivered it. Also, the handling by the operator of the partially cured mold was subject to breakage due to careless handling, especially with complicated molds which had thin elongated parts thereon. Also, any slight cocking of the mold during delivery could often break parts from the mold rendering them useless.

Accordingly, an object of the invention is to provide a transfer mechanism for a molding machine wherein the completed mold is delivered to the transfer mechanism which carefully and gently receives this completed mold and delivers it to a place of removal from the machine.

Another object of the invention is to provide a transfer mechanism to move a completed mold both vertically and horizontally from a discharge station of the machine to a point of removal from the machine.

Another object of the invention is to provide a transfer mechanism for a molding machine which ejects the completed mold under a force which is restrained by an opposing but lesser force to carefully eject the completed mold without breakage.

Another object of the invention is to provide a transfer mechanism including first transfer means to receive and move downwardly a completed mold and a second transfer means having strip means interleaved with strip means of the first transfer means to next receive the completed mold and to move it generally horizontally.

Other objects and a fuller understanding of the invention may be had by referring to the following description and claims, taken in conjunction with the accompanying drawings, in which:

FIGURE 2 is a side elevational view of the machine of FIGURE 1; and

FIGURE 3 is a schematic combined hydraulic and electrical diagram for the machine of FIGURES 1 and 2.

Figure 1:
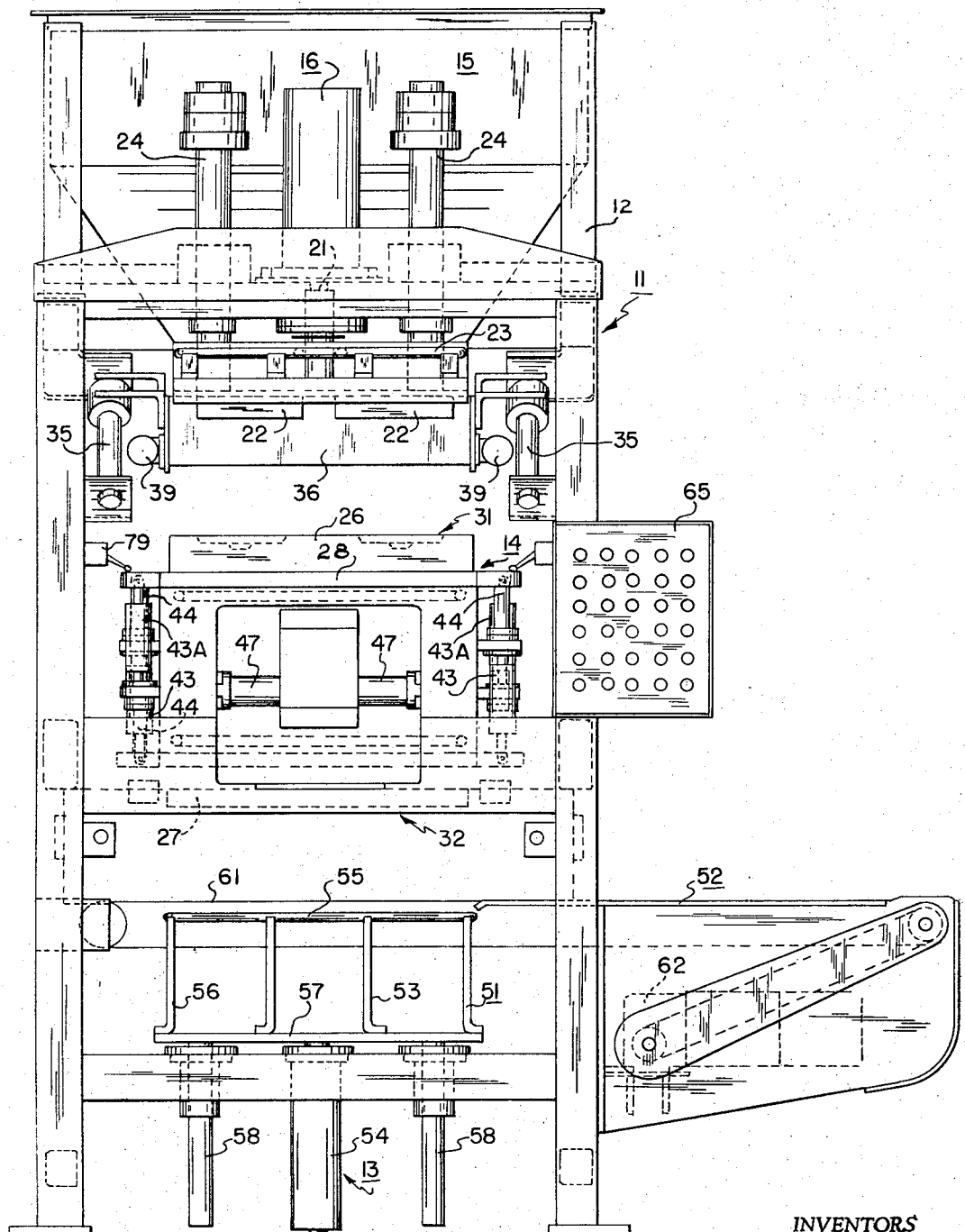
FIGURE 1 is a front elevational view of a machine embodying the invention.

The invention relates generally to a transfer mechanism for use with a molding machine or other machine having relatively fragile parts to be transferred from one place to another and FIGURES 1 and 2 show the invention incorporated in a molding machine 11. This machine 11 has a frame 12 and also generally includes a transfer means or mechanism 13, a mold box assembly 14, a molding material hopper 15 and pressing means 16. The molding material hopper 15 may be a molding material which will cure into a relatively hard state, such as sand mixed with a resin or other adhesive binder. This machine 11 will make solid sand cores or molds and when the term mold is used herein, it is used to indicate either a core or a mold depending upon the use to which the machine is adapted. The molding material may generally be referred to hereinafter as sand even though it is usually mixed with some adhesive or binder.

The pressing means 16 is a motive means which includes a fluid piston and cylinder means adapted for vertical movement. This fluid and cylinder means includes a vertically movable piston rod 21 carrying a press plate 22 which may be rectangular in shape and heated by a gas manifold 23 or other heating means. Guide rods 24 guide the press plate 22 to maintain it horizontal during its vertical movement.

The mold box assembly 14 is adapted to carry first and second mold boxes 26 and 27 on first and second opposite mold box stations 28 and 29 thereof. The mold box assembly 14 may be considered a tumbling assembly and may rotate, tumble or oscillate on a horizontal axis 30 to alternatively present a mold box, such as mold box 26, at a first or pressing station 31 and a mold box, such as box 27, at a discharge station 32. Preferably the first or pressing station 31 is vertically above the horizontal axis 30 and the discharge station 32 is vertically beneath the horizontal axis 30. The first or pressing station is also vertically beneath the pressing means 16.

Guide rods 35 are fixed on the frame 12 and slope upwardly to the rear. A sand or molding material transfer box 36 is mounted to reciprocate on the guide rods 35 from a first position beneath the hopper 15 to a second position on top of a mold box, such as box 26, at the pressing station 31. A fluid cylinder 37 may provide this motion of the sand transfer box 36. A shutter 38 on the bottom of the transfer box is movable generally horizontally by a fluid cylinder 39 and is openable to drop molding material by gravity into the mold box at the pressing station 31. A vibrator 40 may be mounted in any suitable place, such as on the sand transfer box 36, to vibrate this box to aid in having all of the sand fall out of this box into the mold box 26. The fluid cylinder 39 is movable to close the shutter 38 to strike off the sand horizontally substantially at the top of the mold box in this pressing station 31. The fluid cylinder 37 is operable to return the sand transfer box 36 to the position beneath the hopper 15 so that the pressing means 16 may press the press plate 22 down against the sand in the mold box at the pressing station 31.

The mold box assembly 14 also includes first and second stripper plates 41 and 42, respectively. Stripper motive means 43 and 43A are provided to move these stripper plates individually. There preferably are two fluid piston and cylinder means, one in each of two diagonally opposite corners connected to move each stripper plate. These stripper plates may move on guide rods 44. Each stripper plate carries a plurality of stripper pins 45 which move parallel to the stripper motive means and pass through corresponding holes 46 in the mold boxes 26 and 27 so as to be able to strip or eject the completed mold from the mold boxes, which mold is at least partially cured. The mold box assembly 14 may be tumbled 180 degrees by fluid cylinders 47 acting through a rack and pinion, not shown. The mold box assembly is a means to tumble each mold box 26 and 27 between the pressing station and the discharge station and accordingly is a means to present at the discharge station an inverted mold box with a filled and at least partially cured mold therein.

The transfer mechanism 13 includes generally first and second transfer means 51 and 52, respectively, and together provide vertical and horizontal movement to a completed mold. The first transfer means 51 may be termed an elevator transfer means or a transfer elevator. This first transfer means includes generally a rack assembly 53 and rack motive means or rack fluid piston and cylinder means 54. The rack assembly 53 includes strips or strip means 55 which have a generally horizontal flat-topped surface. Legs 56 support these strip means from a plate 57 moved by the rack motive means 54. The strips 55 and racks 56 may be considered to be inverted U-shaped strips to support a completed mold on the upper surface thereof. Guide rods 58 again are provided to guide the movement of this rack assembly 53.

The second transfer means 52 may also be termed a transfer conveyor or a ribbon conveyor. This ribbon conveyor has a plurality of belts or ribbons 61 with an upper run of this conveyor being generally horizontal and adapted for generally horizontal movement to move a completed mold out from underneath the discharge station 32 to a position at the side of the machine 11. These plural ribbons 61 may be considered plural parts of the ribbon conveyor and may be considered second strip means interleaved with the strip means 55 of the first transfer means 51. These belts or ribbons may be open mesh wire belts so that any sand particles will not remain on the upper surface thereof, but will readily fall through the open mesh. A motor 62 is provided to drive this ribbon conveyor as desired. The transfer motive means includes the fluid cylinder means 54, 43 and 43A and the motor 62.

Control functions for the entire machine 11 may be controlled from a control panel 65 placed at the front of the machine near the ribbon conveyor 52.

FIGURE 3 shows schematically a portion of the control system 68 for the machine 11. This FIGURE 3 shows the rack assembly motive means 54 as a fluid piston and cylinder means. This cylinder means 54 is controlled by a solenoid valve 69, a fluid actuated valve 70 and a restrictor valve 71. The control system in FIGURE 3 also shows the stripper fluid cylinders 43 to eject the completed mold from mold box 26 when the mold box assembly 14 is tumbled to the clockwise position, and further shows the stripper fluid cylinders 43A to eject the completed mold from mold box 27 when the mold box assembly 14 is tumbled to the counterclockwise position. The stripper cylinders 43 are controlled by a solenoid valve 73 and a fluid actuated valve 74. The stripper fluid cylinders 43A are controlled by a solenoid valve 76 and a fluid actuated valve 77.

In the control of the rack cylinder means 54, a switch 78 and switch 79 control energization of the solenoid valve 69. The fluid valve 70 has a small area chamber 80 and a large area chamber 81 at the opposite end. The small area chamber 80 is connected to a pump line 82 or source of fluid pressure. A conduit 83 leads from valve 70 to the upper end of rack cylinder 54 and a conduit 84 leads from valve 70 to valve 71.

In the control for the stripper cylinders 43 the switch 78 and a switch 85 control the solenoid valve 73. The fluid valve 74 has a small area chamber 86 connected to the pump line 82 and has a large area chamber 87 at the opposite end of this valve. A conduit 88 leads from valve 74 to the upper end of stripper cylinders 43 and a conduit 89 leads from valve 74 to the lower end of the stripper cylinders 43. A conduit 90 is branched off conduit 88 and leads to a double check valve 91 and then through a conduit 92 to actuate the valve 71. This restrictor valve 71 has a variable restrictor orifice 93 leading to the exhaust line 94.

The stripper cylinders 43A have the switch 78 and a switch 97 controlling the solenoid valve 76 and other connections are similar to those provided for the stripper cylinders 43.

*Operation*

The sand transfer box 36 receives sand or molding material from the hopper 15. The fluid cylinder 37 moves this sand transfer box 36 down the guide rods 35 to the second position on top of the mold box in the pressing station 31. As shown in FIGURES 1 and 2, this is the mold box 26 although alternatively it may be the mold box 27. The vibrator 40 is actuated and the shutter 38 is opened by the fluid cylinder 39 to dump the molding material into the mold box 26. The mold boxes 26 and 27 may be heated by means not shown, for example, a gas manifold similar to manifold 23. The shutter 38 is next closed, thus striking off the sand level with the top of the mold box 26. The sand transfer box 36 returns to the first position beneath the hopper 15. Next the pressing means 16 is actuated and the heated press plate 22 is moved downwardly. This press plate moves downwardly to a fixed stop to compress the molding material in the mold box 26 to a predetermined thickness. The fact that the press plate 22 is heated aids at least a partial curing of this filled mold box.

Next the pressing means 16 retracts upwardly and then the fluid cylinders 47 tumble the mold box assembly 14. This tumbling action is shown to be 180 degrees to present the filled and partially cured mold in the mold box 26 at the discharge station 32. This is the position formerly occupied by mold box 27, as shown in FIGURES 1 and 2. The filled and at least partially cured mold is now ready to be ejected from the mold box at the discharge station 32. This is accomplished by having the rack assembly 53 move upwardly to a position closely adjacent the completed mold. The lower surface of this mold will be flat, having been pressed flat by the press plate 22. It will thus easily rest upon the flat upper surface of the stripper means 55 of this rack assembly 53. In general the completed mold is ejected, the rack assembly 53 moves downwardly and transfers the completed mold onto the ribbon conveyor or second transfer means 52. From here it moves horizontally outwardly and then stops when the completed mold is out from beneath the machine 11.

More specifically, the action of the ejection of the completed mold will now be described. When the tumbling apparatus has tumbled to one of its two alternative positions, for example, to its clockwise position as seen in FIGURE 1, then switch 79 is actuated, for example, by the mold box assembly 14, This energizes solenoid valve 69 to move it to the right against a spring urging from the position shown. Previously pump pressure from the pump line 82 entered through the solenoid valve 69 and into the large area chamber 81 to keep the fluid-actuated valve 70 to the lift. Now this pump pressure is blocked from entering the large area chamber 81 and as a result pump pressure from line 82, acting on the small area chamber 80, moves valve 70 to the right. Thus it will be seen that when valve 69 moves to the right, valve 70 also moves to the right.

Pump pressure formerly was available through valve 70 and conduit 83 to hold the rack cylinder 54 downwardly. Now pump pressure enters through valve 70, conduit 84 and valve 71 to have the rack motive means 54 move upwardly. This moves the rack assembly 53 upwardly so that the strip means 55 moves vertically upwardly between the ribbons of the ribbon conveyor from a lower, retracted position shown in FIGURES 1 and 2 to an upper position closely adjacent the mold box 26 now at the discharge station 32. The strip means 55 preferably moves into engagement with the completed mold or at least closely adacent to this completed mold.

When the motive means 54 has reached its uppermost position, switch 85 is actuated, for example, by the rack motive means 54. This energizes solenoid valve 73 moving it to the right. Pump pressure formerly entered through valve 73 to the large area chamber 87 and kept valve 74 to the left, as viewed in FIGURE 3. Now pump pressure is blocked from entering large area chamber 87 and the pump pressure on the small area chamber 86 moves valve 74 to the right. Accordingly, valve 74 moves to the right when valve 73 moves to the right. Pump pressure formerly entered from conduit 82 through valve 74 and conduit 89 to keep the stripper cylinders 43 in the retracted or upper position. Now pump pressure enters through valve 74 through conduit 88 to actuate the stripper cylinders 43 downwardly. This actuates stripper plate 41 downwardly and the stripper pins 45 eject the completed mold from the mold box 26.

Simultaneously with pump pressure being applied to conduit 88, it is also led via conduit 90 and check valve 91 and conduit 92 to actuate the fluid valve 71 to the left. This connects the lower end of the rack cylinder 54 through the restrictor orifice 93 to the exhaust line 94. The upper end of the rack cylinder is connected to exhaust and thus the stripper cylinders 43 are able to push the rack motive means downwardly. In an actual machine the two stripper cylinders 43 were each of 3 inch bore and the rack cylinder means 54 was a 4 inch bore. With approximately 100 pounds per square inch of air pressure on the pump line 82, the two stripper cylinders produced about 1,400 pounds force which will overcome the resisting force of the 4 inch diameter rack cylinder which is exhausting essentially to atmosphere through the restrictor orifice 93. Such restrictor orifice would thus create a restraining force of in the order 180 to 800 pounds. Accordingly, the completed core is gradually but firmly forced downwardly out of the mold box 26 under firm pressure and opposed by a lesser force. These two opposing forces make sure that the completed core is carefully ejected from the mold box in the discharge station 32 without any cocking of the completed mold. Any such cocking might break off long slender portions of the completed mold, thus rendering it useless.

The stripper cylinders 43 may have a shorter stroke than that of the rack cylinder, which stroke of the stripper cylinders is only sufficient to assure that the completed mold is completely released from the mold box. Upon completion of the downward stroke of the stripper cylinders 43, the switch 78 is actuated. This de-energizes the solenoid valves 69 and 73. De-energization of the solenoid valve 73 causes this valve to move back to the left and causes valve 74 to move back to the left, to the positions shown in FIGURE 3. Pump pressure is now applied through valve 74 to conduit 89 to cause the stripper cylinders 43 to retract upwardly. Also pressure is no longer supplied on conduit 90 and thus the valve 71 moves back to the right, to the position shown in FIGURE 3. De-energization of solenoid valve 69 moves it to the left under spring urging and valve 70 also moves to the left to the positions shown in FIGURE 3. Pump pressure now is applied through valve 70 and conduit 83 to the upper end of the rack cylinder 54. This rapidly lowers the rack assembly 53 which lowers sufficiently to transfer the completed mold onto the ribbon conveyor 52. This ribbon conveyor is next energized to move the completed mold outwardly from underneath the machine 11 to a position near the outer end of the ribbon conveyor 52. The ribbon conveyor is there stopped and the completed mold is ready for transfer either mechanically or by an operator onto another conveyor or to be stacked on a pallet, for example.

The machine is ready for another alternate cycle of operation and upon the next cycle, the mold box assembly 14 rotates counterclockwise whereat the stripper cylinders 43A are used and the actuation of these cylinders by means of valves 76 and 77 takes place in essentially the same manner as that described above for actuation of the stripper cylinders 43. One difference is that upon raising of the rack motive means 54 during this alternate cycle, the switch 97 instead of switch 85 will be actuated, so that the stripper cylinders 43A are used, and stripper cylinders 43 are inactive.

The present disclosure includes that contained in the appended claims, as well as that of the foregoing description.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:
1. A molding machine for use with a mold box comprising, in combination, a frame,
    a discharge station on said frame,
    means to fill a mold box with molding material and to at least partially cure said molding material into a completed mold,
    means to present the filled mold box at said discharge station in an inverted position,
    transfer means mounted on said frame beneath said discharge station for movement with a vertical component,
    motive means to move said transfer means upwardly from a lower, retracted position to an upper position closely adjacent the mold box at said discharge station,
    stripper motive means to eject the completed mold from a mold box at said discharge station onto said transfer means with a first force,
    and means to control said transfer motive means to resist downward movement of said transfer means such that said first force must overcome the resistance to downward movement of said transfer motive means to thus hold said completed mold between two opposing forces to positively but carefully eject the mold from a mold box.

2. A molding machine for use with a mold box comprising, in combination, a frame,
    a discharge station on said frame,
    means to fill a mold box with molding material and to at least partially cure said molding material into a completed mold, means to present the filled mold box at said discharge station in an inverted position, first transfer means mounted on said frame beneath said discharge station for generally vertical movement and having first strip means, second transfer means mounted on said frame beneath said discharge station for generally horizontal movement and having second strip means interleaved between said first strip means, each of said strip means presenting a generally flat-topped surface generally parallel to a mold box in said discharge station, fluid pressure means to move said first transfer means generally vertically upwardly between the strip means of said second transfer means from a lower, retracted position to an upper position closely adjacent the mold box at said discharge station, stripper motive means to eject the completed mold from a mold box at said discharge station onto said first transfer means with a first force, and means to control said fluid pressure means including a restrictor orifice to resist downward movement of said first transfer means such that said stripper motive means must overcome the resistance to downward movement of said fluid pressure means to push said completed mold from a mold box and to push said first transfer means downwardly to thus hold said completed mold between two opposing forces to positively but carefully eject the completed mold from a mold box and to transfer the completed mold onto said second transfer means.

3. A molding machine for use with a mold box comprising in combination, a frame, a discharge station on said frame, means to fill a mold box with molding material and to at least partially cure said molding material into a completed mold, means to present the filled mold box at said discharge station in an inverted position, first transfer means mounted on said frame beneath said discharge station for generally vertical movement and having first strip means, second transfer means mounted on said frame beneath said discharge station for generally horizontal movement and having second strip means interleaved between said first strip means, each of said strip means presenting a generally flat-topped surface generally parallel to a mold box in said discharge station, means to move said first transfer means directly vertically upwardly between the strip means of said second transfer means from a lower, retracted position to an upper position closely adjacent the mold box at said discharge station, means to eject the completed mold from a mold box at said discharge station onto said first transfer means and to push said first transfer means vertically downwardly therewith, and means to cause resistance to downward movement of said first transfer means to hold the mold between opposing forces during at least the initial downward movement of the mold to transfer the mold onto the flat-topped surface of said second transfer means for movement generally horizontally with said second transfer means.

4. A molding machine for use with a mold box comprising, in combination, a frame, a discharge station on said frame, means to fill a mold box with molding material and to at least partially cure said molding material into a completed mold, transfer means mounted on said frame beneath said discharge station for generally vertical and horizontal movement, said transfer means having a flat-topped surface of strip means, means to establish the filled mold box at said discharge station in an inverted position with the completed mold facing downwardly, means directly vertically to move said transfer means upwardly from a lower, retracted position to an upper position closely adjacent the mold box at said discharge station, means to eject the completed mold downwardly from a mold box at said discharge station onto said transfer means and to move said transfer means vertically downwardly therewith, and means to move said transfer means generally horizontally to generally horizontally move the completed mold away from beneath said discharge station.

5. A molding machine for use with a mold box comprising, in combination, a frame, a first station and a discharge station on said frame, means to fill a mold box with molding material at said first station, means to at least partially cure a mold in a mold box at said first station, transfer means mounted on said frame beneath said discharge station for directly vertical movement, means to present the filled mold box at said discharge station in an inverted position, means to move said transfer means directly vertically from a lower, retracted poistion to an upper position closely adjacent the mold box at said discharge station, means to eject the completed mold directly vertically downwardly from a mold box in said discharge station onto said transfer means and to move said transfer means vertically downwardly therewith.

6. A molding machine for use with a mold box comprising, in combination, a frame, a first station and a discharge station on said frame, means to fill a mold box with molding material at said first station, means to at least partially cure a mold in a mold box at said first station, flat-topped elevator transfer means of a plurality of strips, means to present the filled mold box at said discharge station in an inverted position, means to move said elevator transfer means generally vertically from a lower, retracted position to an upper position closely adjacent the mold box at said discharge station, means to eject the completed mold for a mold box in said discharge station on to said elevator transfer means and to push said elevator transfer means directly vertically downwardly therewith, and means to cause resistance to vertically downward movement of said elevator transfer means to maintain a completed mold under forces exerted on the top and bottom of the mold.

7. A molding machine comprising, in combination, a frame, a molding material hopper on said frame, a tumbling assembly mounted for 180 degree tumbling movement on a horizontal axis on said frame, first and second alternative mold box stations on said tumbling assembly and adapted to hold first and second oppositely disposed mold boxes thereon alternatively at a first station and at a discharge station vertically beneath said tumbling assembly axis, means to fill a mold box with molding material from said hopper at said first station, means to at least partially cure a mold in a mold box at said first station, a stripper plate on said tumbling assembly, a ribbon conveyor mounted on said frame for generally horizontal movement of the upper run of the conveyor and with said ribbon conveyor mounted generally vertically beneath said discharge station of said tumbling assembly, a rack assembly of a plurality of strips, means to tumble said tumbling assembly 180 degrees to present the filled mold box at said discharge station, means to move said rack assembly vertically between the ribbons of said ribbon conveyor from a lower, retracted position to an upper position closely adjacent the filled mold box at said discharge station, means to actuate said stripper plate to eject the completed mold from a mold box in said discharge station onto said rack assembly and to push said rack assembly downwardly, and means to cause downward retraction of said rack assembly to have said rack assembly place a completed mold on said ribbon conveyor upper run for movement horizontally with said ribbon conveyor.

8. A press-type molding machine comprising, in combination, a frame, a molding material hopper on said frame, a tumbling assembly mounted for 180 degree tumbling movement on a horizontal axis on said frame, first and second alternative mold box stations on said tumbling assembly and adapted to hold first and second oppositely disposed mold boxes thereon alternatively at a first station and at a discharge station vertically beneath said tumbling assembly axis, means to fill a mold box with molding material from said hopper at said first station, means including a heated press plate to press downwardly against the molding material in a mold box to cure and compress same to a predetermined thickness, first and second stripper plates on said tumbling assembly, a ribbon conveyor mounted on said frame for generally horizontal movement of the upper run of the conveyor and with said ribbon conveyor mounted generally vertically beneath said discharge station of said tumbling assembly, a rack assembly of a plurality of strips, means to tumble said tumbling assembly 180 degrees to present the filled and pressed mold box at said discharge station, means to move said rack assembly vertically between the ribbons of said ribbon conveyor from a lower, retracted position to an upper position in engagement with the pressed molding material in the mold box at said discharge station, means to actuate one of said stripper plates to eject the completed mold from a mold box in said discharge station onto said rack assembly and to push said rack assembly downwardly, and means to cause downward retraction of said rack assembly to have said rack assembly place a completed mold on said ribbon conveyor upper run for movement horizontally with said ribbon conveyor.

9. A press-type molding machine comprising, in combination, a frame, a molding material hopper on said frame, a tumbling assembly mounted for 180 degree tumbling movement on a horizontal axis on said frame, first and second alternative mold box stations on said tumbling assembly and adapted to hold first and second oppositely disposed mold boxes thereon alternatively at a first station and at a discharge station vertically beneath said tumbling assembly axis, a sloping track on said frame, a transfer box reciprocable on said sloping track from a first position beneath said hopper to a second position on top of a mold box at said first station, a shutter on the bottom of said transfer box movable generally horizontally and openable at said second position to drop molding material by gravity into a mold box at said first station, a vibrator actuatable with said transfer box at said second position to vibratingly fill a mold box with molding material from said transfer box, means to close said shutter to strike off the molding material horizontally at the top of said mold box, means to return said transfer box to said first position, means including a heated press plate to press downwardly against the molding material in a mold box to compress same to a predetermined thickness, first and second stripper plates on said tumbling assembly, a ribbon conveyor mounted on said frame for generally horizontal movement of the upper run of the conveyor and with said ribbon conveyor mounted generally vertically beneath said discharge station of said tumbling assembly, a rack assembly of a plurality of strips, means to tumble said tumbling assembly 180 degrees to present the filled and pressed mold box at said discharge station, means to move said rack assembly vertically between the ribbons of said ribbon conveyor from a lower, retracted position to an upper position closely adjacent the mold box at said discharge station of said tumbling assembly, means to actuate one of said stripper plates to eject the completed mold from a mold box in said discharge station onto said rack assembly and to push said rack assembly downwardly, and means to cause downward retraction of said rack assembly to have said rack assembly place a completed mold on said ribbon conveyor upper run for movement horizontal with said ribbon conveyor.

10. A press-type molding machine comprising, in combination, a frame, a tumbling asembly mounted for 180 degree tumbling movement on a horizontal axis on said frame, first and second alternative mold box stations on said tumbling assembly and adapted to hold first and second oppositely disposed mold boxes thereon alternatively at a first station and at a discharge station vertically beneath said tumbling assembly axis, means to fill a mold box at said first station with molding material, means at said first station to press and cure molding material in a mold box, means to tumble said tumbling assembly about the axis thereof to present a filled mold box at said discharge station, first and second stripper plates on said tumbling asembly, stripper fluid piston and cylinder means to actuate said first and second stripper plates, a ribbon conveyor mounted on said frame for generally horizontal movement of the upper run of the conveyor and with said ribbon conveyor mounted generally vertically beneath said discharge station of said tumbling assembly, rack fluid piston and cylinder means mounted on said frame vertically beneath said ribbon conveyor, a rack assembly of a plurality of strips movable by said rack fluid piston and cylinder means vertically between the ribbons of said ribbon conveyor from a lower, retracted position to an upper position closely adjacent the mold box at said discharge station of said tumbling assembly, means to actuate said stripper fluid piston and cylinder means to actuate one of said stripper plate to eject the completed mold from a mold box in said discharge station onto said rack assembly and to push said rack assembly and rack fluid piston and cylinder means downwardly, and means to caused ownward retraction of said rack piston and cylinder means and said rack assembly to have said rack assembly place a completed mold on said ribbon conveyor upper run for movement horizontally with said ribbon conveyor.

11. A press-type molding machine comprising, in combination, a frame,
- a sand hopper on said machine to contain a sand and adhesive mixture,
- pressing motive means on said frame arranged for vertical movement,
- a tumbling asembly mounted for 180 degree tumbling movement on a substantialy horizontal axis on said frame,
- first and second alternative mold box stations on said tumbling assembly and adapted to hold first and second oppositely positioned mold boxes thereon alternatively at a pressing station vertically beneath said pressing motive means and at a discharge station vertically beneath said tumbling assembly axis,
- a sloping track on said frame,
- a transfer box reciprocable on said sloping track from a first position beneath said hopper to a second position on a mold box at said pressing station,
- means to move sand from said transfer box into a mold box at said pressing station,
- means to return said transfer box to said first position,
- a heated press plate on the lower end of said pressing motive means,
- means to actuate said pressing motive means to move said heated press plate downwardly against the sand in a mold box to compress same to a predetermined thickness,
- means to retract said pressing motive means,
- first and second stripper plates on said tumbling assembly cooperating with the first and second mold boxes, respectively,
- stripper motive means to actuate said first and second stripper plates,
- a ribbon conveyor mounted on said frame for generally horizontal movement of the upper run of the conveyor and with said ribbon conveyor mounted generally vertically beneath said discharge station of said tumbling assembly,
- rack motive means mounted on said frame vertically beneath said ribbon conveyor,
- a rack assembly of a plurality of inverted U-shaped strips movable by said rack motive means vertically between the ribbons of said ribbon conveyor from a lower, retracted position to an upper position closely adjacent the mold box at said discharge station of said tumbling assembly,
- means to tumble said tumbling assembly about the axis thereof to present a filled and pressed mold box at said discharge station,
- means to actuate said stripper motive means to actuate one of said stripper plates to eject the completed mold from a mold box in said discharge station onto said rack assembly and to push said rack assembly and rack motive means downwardly,
- and means to cause downward retraction of said rack motive means and said rack assembly to have said rack assembly place a completed mold on said ribbon conveyor for movement horizontally with said ribbon conveyor.

12. A press-type molding machine comprising, in combination, a frame,
- a sand hopper on said frame to contain a sand and adhesive mixture,
- pressing fluid piston and cylinder means on said frame arranged for vertical movement and positioned laterally of said sand hopper,
- a tumbling assembly mounted for 180 degree tumbling movement on a horizontal axis on said frame,
- first and second alternative mold box stations on said tumbling assembly and adapted to hold first and second oppositely disposed mold boxes thereon alternatively at a pressing station vertically beneath said pressing piston and cylinder means and at a discharge station vertically beneath said tumbling assembly axis,
- a sloping track on said frame,
- a transfer box reciprocable on said sloping track from a first position beneath said hopper to a second position on top of a mold box at said pressing station,
- a shutter on the bottom of said transfer box movable generally horizontally and openable at said second position to drop sand by gravity into a mold box at said pressing station,
- a vibrator actuatable with said transfer box at said second position to vibratingly fill a mold box with sand from said transfer box,
- means to close said shutter to strike off the sand horizontally at the top of the mold box,
- means to return said transfer box to said first position,
- a heated press plate on the lower end of said pressing piston and cylinder means,
- means to actuate said pressing piston and cylinder means to move said heated press plate downwardly against the sand in a mold box to compress same to a predetermined thickness,
- means to retract said pressing piston and cylinder means,
- first and second stripper plates on said tumbling assembly cooperating with the first and second mold boxes, respectively,
- stripper fluid piston and cylinder means to actuate said first and second stripper plates,
- a ribbon conveyor of a plurality of ribbons mounted on said frame for generally horizontal movement of the upper run of the conveyor and with said ribbon conveyor mounted generally vertically beneath said discharge station of said tumbling assembly,
- rack fluid piston and cylinder means mounted on said frame vertically beneath said ribbon conveyor,
- a rack assembly of a plurality of inverted U-shaped strips with an upper mold receiving surface and movable by said rack fluid piston and cylinder means vertically between the ribbons of said ribbon conveyor from a lower, retracted position to an upper position closely adjacent the mold box at said discharge station of said tumbling assembly,
- means to tumble said tumbling assembly 180 degrees about the axis thereof to present the filled and pressed mold box at said discharge station,
- means to actuate said stripper fluid piston and cylinder means to actuate said stripper plate to eject the completed mold from a mold box in said discharge station onto said rack assembly and to push said rack assembly and rack fluid piston and cylinder means downwardly,
- and means to cause downward retraction of said rack piston and cylinder means and said rack assembly to have said rack assembly place a completed mold on said ribbon conveyor upper run for movement horizontally with said ribbon conveyor.

13. A transfer mechanism for use with a mold box comprising, in combination, a frame,
- a transfer station on said frame,
- means to introduce molding material into a mold box,
- means to present the mold box at said station in a position with the mold therein facing downwardly,
- transfer means mounted on said frame beneath said station for movement with a vertical component,
- motive means to move said transfer means upwardly from a lower, retracted position to an upper position closely adjacent the mold box at said station,
- stripper motive means to eject the mold from a mold box at said station onto said transfer means with a first force, and means to resist downward movement of said transfer means such that said first force must overcome the resistance to downward movement of said transfer means to thus hold said mold between two opposing forces to positively but carefully eject the mold from a mold box.

14. A molding machine for use with a mold box comprising, in combination, a frame,
a discharge station on said frame,
means to introduce molding material into a mold box,
means to present the mold box with molding material therein at said discharge station in an inverted position,
transfer means mounted on said frame beneath said discharge station for movement with a vertical component,
motive means to move said transfer means upwardly from a lower, retracted position to an upper position closely adjacent the mold box at said discharge station,
stripper motive means to eject the completed mold from a mold box at said discharge station onto said transfer means with a first force,
and means to resist downward movement of said transfer means such that said first force must overcome the resistance to downward movement of said transfer means to thus hold said completed mold between two opposing forces to positively but carefully eject the mold from a mold box.

15. A transfer mechanism for use with a mold box comprising, in combination, a frame,
a transfer station on said frame,
means to introduce molding material into a mold box,
means to present the mold box at said station in a position with the mold therein facing downwardly,
transfer means mounted on said frame beneath said station for generally vertical movement,
fluid pressure means to move said transfer means generally vertically upwardly from a lower, retracted position to an upper position closely adjacent the mold box at said station,
stripper motive means to eject the mold from a mold box at said station onto said transfer means with a first force,
and means to control said fluid pressure means including a restrictor orifice to resist downward movement of said transfer means such that said stripper motive means must overcome the resistance to downward movement of said fluid pressure means to push said mold from a mold box and to push said transfer means downwardly to thus hold said mold between two opposing forces to positively but carefully eject the mold from a mold box.

References Cited
UNITED STATES PATENTS

| | | | |
|---|---|---|---|
| 1,957,287 | 5/1934 | Oyster | 22—32 X |
| 2,268,208 | 12/1941 | Fellows | 22—32 |
| 2,542,243 | 2/1951 | Gedris | 22—20 X |
| 2,669,759 | 2/1954 | Valyi | 22—34 X |
| 2,812,792 | 11/1957 | Allbright | 146—94 X |
| 2,821,747 | 2/1958 | Rossiter | 18—17 X |
| 2,989,104 | 6/1961 | Good | 146—94 |
| 3,099,304 | 7/1963 | Monsees et al. | 146—94 |

J. SPENCER OVERHOLSER, *Primary Examiner.*

E. MAR, *Assistant Examiner.*